United States Patent [19]

Brakenhoff

[11] Patent Number: 4,796,974

[45] Date of Patent: Jan. 10, 1989

[54] DEVICE FOR FOCUSING ELECTROMAGNETIC WAVES OR SOUND

[75] Inventor: Godefridus J. Brakenhoff, Amsterdam, Netherlands

[73] Assignee: Stichting Voor De Technische Wetenschappen, Utrecht, Netherlands

[21] Appl. No.: 145,606

[22] Filed: Jan. 19, 1988

[30] Foreign Application Priority Data

Jan. 21, 1987 [NL] Netherlands .................. 8700148

[51] Int. Cl.⁴ .................................. E02B 7/02
[52] U.S. Cl. .................................. 350/247; 350/255
[58] Field of Search ............... 350/241, 245, 247, 252, 350/255

[56] References Cited

U.S. PATENT DOCUMENTS

| | | | |
|---|---|---|---|
| 3,809,468 | 5/1974 | Moritz | 350/241 |
| 4,099,852 | 7/1978 | Kobierecki et al. | 350/247 |
| 4,462,096 | 7/1984 | Kusaka | 350/252 |
| 4,592,037 | 5/1986 | Ohnuki | 350/255 |
| 4,646,283 | 2/1987 | Ito et al. | 350/255 |
| 4,655,548 | 4/1987 | Jue | 350/245 |

FOREIGN PATENT DOCUMENTS

| | | | |
|---|---|---|---|
| 2015732 | 9/1979 | United Kingdom . | |
| 2154023 | 8/1985 | United Kingdom | 350/247 |
| 8404991 | 12/1984 | World Int. Prop. O. | 350/247 |

OTHER PUBLICATIONS

Bingham et al, "Joystick Control for Inspection Apparatus," IBM Technical Disclosure Bulletin, vol. 12, No. 11, Apr. 1970, pp. 1879-1880.
Harvey et al, "A Miniature Lens Scanner for Acoustic Microscopy," 1983 Ultrasonics Symposium Proceedings, vol. 2, 1983, pp. 605-610.
Davidovits et al, "Scanning Laser Microscope," Nature, vol. 223, No. 5208, Aug. 23, 1969, p. 831.

Primary Examiner—John K. Corbin
Assistant Examiner—Martin Lerner
Attorney, Agent, or Firm—Rosen, Dainow & Jacobs

[57] ABSTRACT

A device for focusing electromagnetic waves or sound, comprising a focusing element (1) fitted in a holder (2). This holder is supported in such a way that moving in three directions perpendicular to each other (X, Y and Z directions) is possible. Drive units (6, 26, 34) are used to move the holder independently in these three directions. To provide for very accurately controllable small movements of the holder in the X, Y and Z direction, the holder rests by means of hinges (7) on at least three legs (4) which at their bottom ends are connected by means of hinges (7) to a structure (5) which can be moved in the Z direction. The holder (2) for movement in the X and Y directions is hingedly connected by two perpendicular edges to a strip which can be moved to and fro by means of a drive element (26, 34).

11 Claims, 6 Drawing Sheets

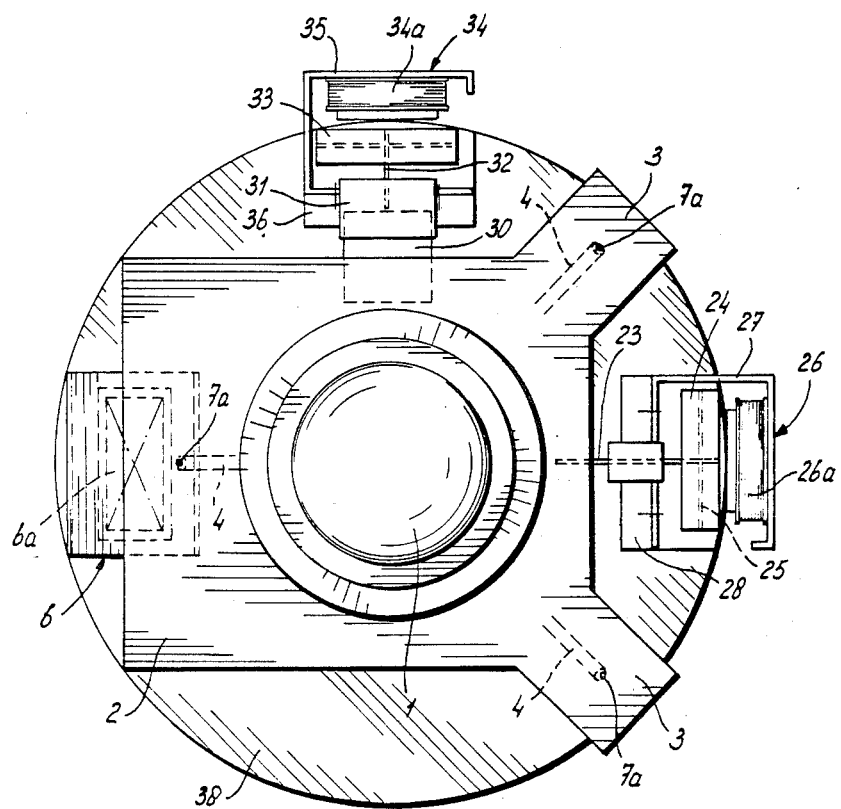

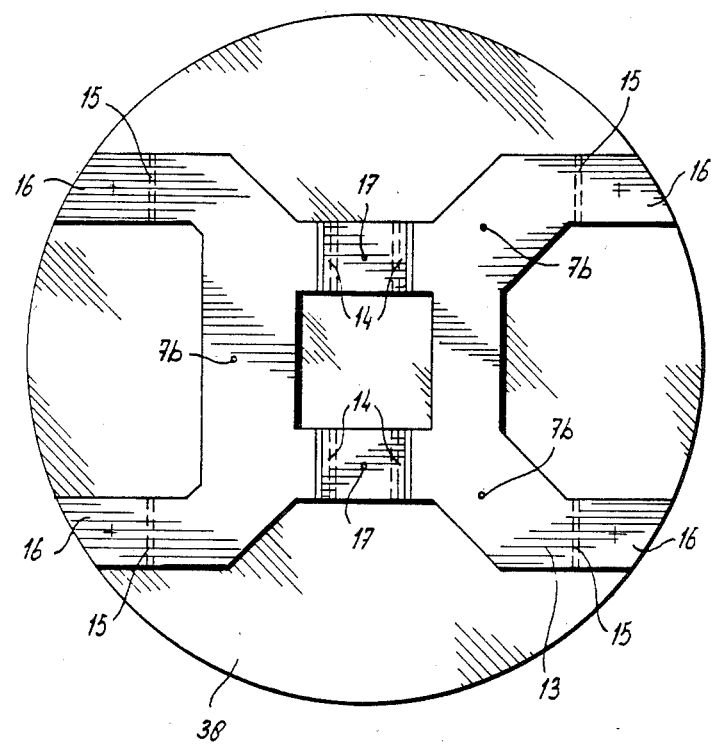

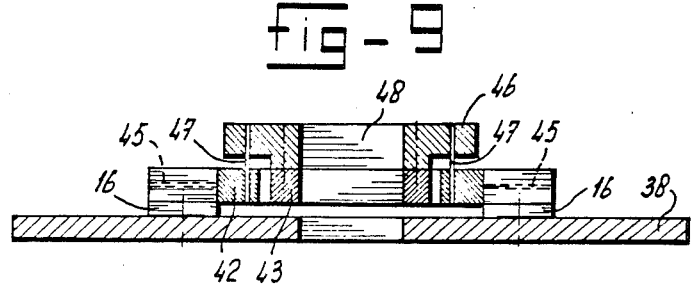
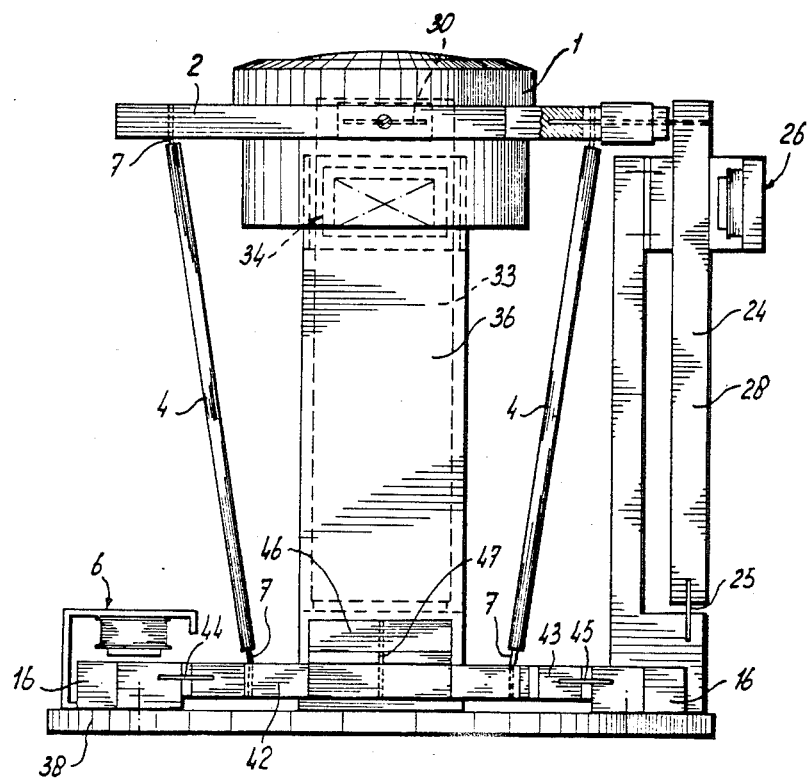

DEVICE FOR FOCUSING ELECTROMAGNETIC WAVES OR SOUND

The invention relates to a device for focusing electromagnetic waves or sound, comprising a focusing element fitted in a holder which is supported in such a way that moving it in three directions perpendicular to each other is possible, while drive units are present to move the holder independently in said three directions.

Such a device is disclosed in "IBM Technical Disclosure Bulletin", vol. 12, no. 11, April 1970, pages 1879–1880, New York, WE Bingham et al: "Joystick control for inspection apparatus".

The focussing device can be used in a microscope, the focusing element being in particular an objective, generally formed by a lens system. The invention is not, however, limited to use in a microscope or to a focusable lens system.

In some forms of light and acoustic microscopy, in particular confocal microscopy, an image of the object to be examined is formed by moving it in three directions perpendicular to each other relative to a lens or lens system or objective. For this purpose the microscope is provided with a scanning table on which the object is fitted. This approach has, however, a number of disadvantages such as a limitation on the mass and dimensions of the object for examination. By moving the holder focussing element instead of the object table in three directions perpendicular and independent to each other (X, Y and Z directions) these disadvantages can be eliminated.

The device disclosed in said IBM Bulletin is not suitable for very accurately controllable small movements of the focussing element. Such an accurate control is, however, necessary for confocal microscopy and some other kinds of microscopy.

The object of the invention is to avoid this disadvantage and to provide a relatively simple structure which can lead to very accurately controllable small movements of the holder in the X, Y and Z direction.

For this purpose according to the invention the holder rests by means of hinges on at least three legs which at their bottom ends are connected by means of hinges to a structure which can be moved in the Z direction, and that the holder for movement in the X and Y directions is hingedly connected by two edges which are perpendicular to each other to a strip which can be moved to and fro by means of a drive element.

Setting up the legs at an angle and directing them at a commmon point means that the optical axis of the focusing element when moved in the X direction and/or Y direction can remain directed at virtually the same point.

The hinges at the top and bottom end of the said legs can be made of very simple short pieces of wire. These can take considerable stresses in the lengthwise direction and still make a controllable bending movement in the transverse direction.

The structure which is movable in the Z direction and on which the legs rest can be made up of a bottom plate and a top plate, the bottom plate comprising three parts, of which the central one is hingedly connected to the outermost part, and at one or more points lying centrally between the hinges is connected to the top plate, which at one edge is movable up and down by a drive unit for the Z direction, and at the opposite edge is hingedly fastened.

In consequence, a hinge movement is converted into a translation movement in the Z direction.

The three parts can be made simply from a single plate through each of the hinges between the central and the outermost Parts consisting of two grooves which are provided at some distance from each other and which are cut in starting from various surfaces of the plate.

Another possibility for the structure which can be moved in the Z direction is that it is made up of two intermeshing hingeable parts whose hinges lie directly opposite each other and a strip which is connected to one of said parts and which is connected by means of wire hinges to the other part.

The edge hinges can be simply a piece of wire. Such a piece can bend in all directions. It has been found that without a special provision the suspension of the holder of the focusing element is too indeterminate, which can lead to uncontrollable movements. That is why the hinge movement of one of the pieces of wire is limited by a bending plate which does permit hinge movement in the Z direction.

There are various possibilities for the drive units, for example hydraulic, pneumatic or mechanical, but an electromagnetic drive is by far preferable. Since a fixed coil can easily be cooled, the drive units preferably have a fixed electromagnet and a movable piece of magnetic or magnetizable material.

The invention also relates to a scanning microscope provided with an object holder and an objective, the object holder assuming a fixed position and the objective being designed as a focusing element as described above.

The invention will now be explained in greater detail with reference to the figures, in which two embodiments are shown.

FIG. 2 shows a top view of the device according to FIG. 1.

FIG. 6 shows a top view of the bottom plate of the structure according to FIGS. 3 and 4.

FIG. 7 shows a side view of a second embodiment of the device according to the invention.

FIG. 9 shows a section along the line IX—IX in FIG. 10.

Figure 1:
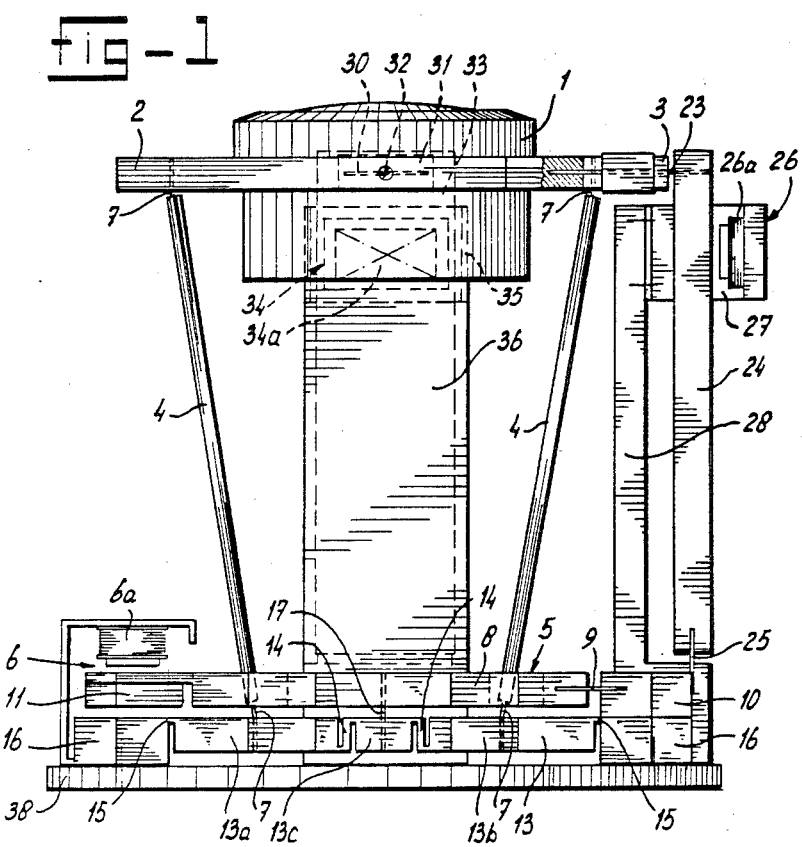
FIG. 1 shows a side view of a first embodiment of the device according to the invention.

The devices shown are intended for moving a schematically shown objective 1 or other focusing element in three directions perpendicular to each other (X, Y and Z directions) independently and in a controllable fashion. Use of the devices in a scanning microscope means that the table holding the object of which an image is to be formed can be stationary. The objective 1 is fixed in an opening of a holder 2 which is designed as a plate with lugs 3.

This holder plate 2 rests on three legs 4, which in turn rest on a structure 5 which can be moved accurately in the vertical direction (Z direction) by means of an electromagnetic drive unit 6.

The top and bottom ends of the legs 4 are provided with short wire pieces 7 which are bendable in all directions, but can take sufficient stress in the lengthwise direction. The places where the top wire pieces 7 of the legs 4 come into contact with the holder plate 2 are indicated by 7a in FIG. 2.

The structure 5 comprises a top plate 8 which is hingedly connected by means of bending strips 9 to the fixed blocks 10. A strip 11 of magnetic or magnetizable material is fastened to the plate 8 opposite the blocks 10 (see FIG. 5). The coil 6a of the drive unit 6 to be excited is situated directly above this strip 11. More or less excitation of the coil will hinge the plate 8 up and down about a free part of the bending strips 9.

Figure 5:
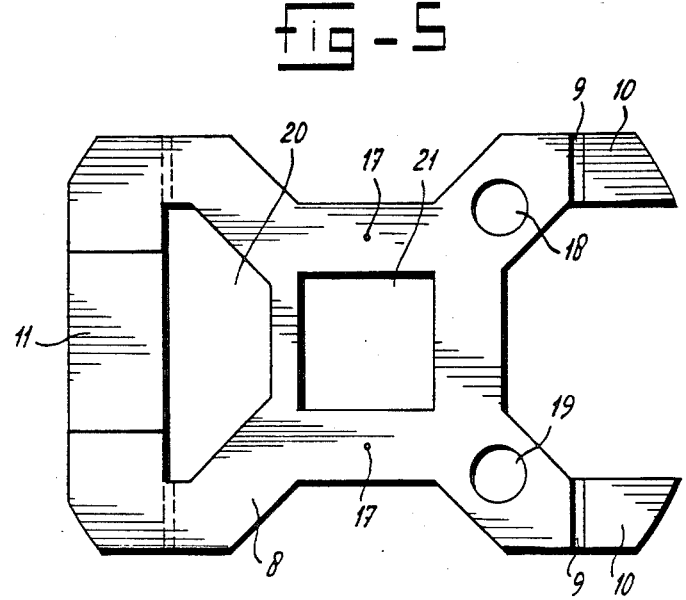
FIG. 5 shows a top view of the top plate of the structure according to FIGS. 3 and 4.
Figure 3:
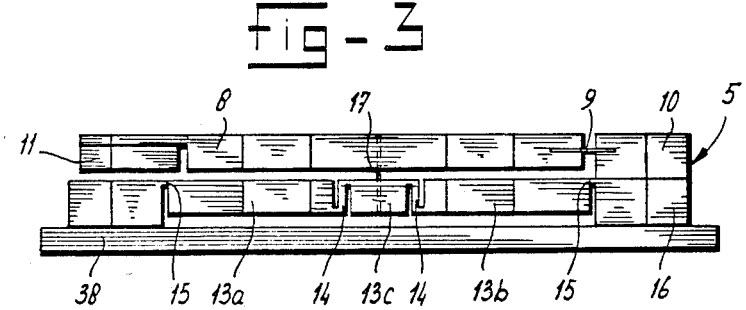
FIG. 3 shows a side view of the supporting structure for the legs of the objective holder of the first embodiment.
Figure 4:
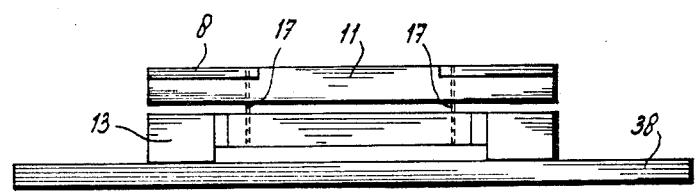
FIG. 4 shows a side view perpendicular to the view of FIG. 3.
Figure 10:
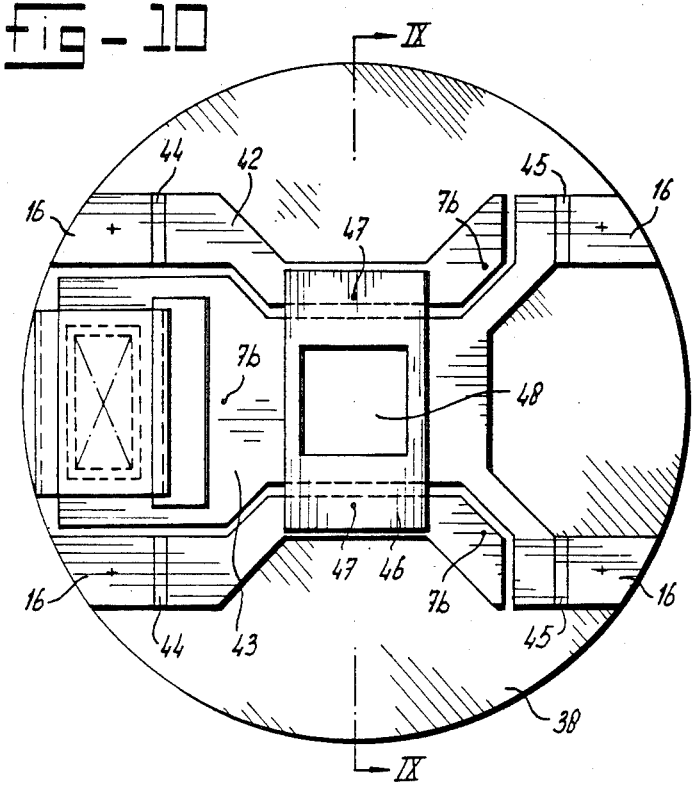
FIG. 10 shows a top view of the support according to FIGS. 8 and 9.
Figure 8:
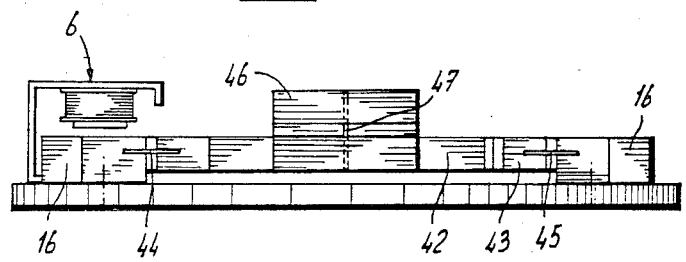
FIG. 8 shows a side view of the support for the legs of the objective holder of the second embodiment.

The structure 5 includes a bottom plate 13 which is made up of three parts 13a, 13b and 13c. The central part 13c is hingedly connected to the side parts 13a and 13b. The hinges 14 intended for this each consist of two grooves which are cut in spaced slightly apart, starting from various surfaces of the plate 13. The hinges 15 between the side parts 13a and 13b and the fixed blocks 16 consist of one incision (see also FIG. 6). The central part 13c is fastening points of these wires 17 to the plate 8 are shown in FIG. 5. This plate also has openings 18, 19 and 20 to allow through the legs 4. A central opening 21 is intended for the passage of the focused light beam.

It will be clear that the hinge movement upward of the top plate 8 causes the central part 13c of the bottom plate 13 to be carried up also over a distance which is half the hinge movement of the plate 8 at the edge lying near the drive unit 6. The upward movement of the central part 13c leads to a symmetrical hinge movement of the side parts 13a and 13b and consequently to an equal upward movement of the legs 4 (in the Z direction). The legs 4 are at the required angle for ensuring that the optical axis of the objective remains directed at virtually a fixed point when there is movement in the X and/or Y direction. When used as a focusing element for an objective corrected to 160 mm this fixed point will lie on the optical axis of the objective at a level of about 160 mm below the scanning device described here. In confocal microscopy when such an objective is used on this point or optical equivalent, the lighting or detection openings will be placed as required in confocal microscopy. If objectives corrected to infinity are used, the legs must be placed parallel to each other, because in that case the optical equivalent fixed point is shifted to infinity.

For the movement of the holder plate 2 in the X direction, this plate is connected by means of a wire 23 to a strip 24 which is hingedly supported at its bottom edge by means of a bending plate 25. The hinge movement of this strip is produced by excitation of an electromagnetic drive unit 26 with a stationary coil 26a and a piece of magnetic or magnetizable material in or on the strip 24.

The unit 26 is fixed by means of a bracket 27 to a fixed upright 28.

For the movement of the holder plate 2 in the Y direction, this plate is connected by means of a bending plate 30 to a block 31 which is in turn connected by means of a short wire 32 to a strip 33 which is hingedly supported by means of a bending plate in the same way as the strip 24. The hinge movement of this strip 33 is produced by excitation of an electromagnetic drive unit 34 with a stationary coil 34a and a piece of magnetic or magnetizable material in or on the strip 33.

The unit 34 is fixed by means of a bracket 35 to a fixed upright 36.

It will be clear that through excitation of the coil 26a the objective moves in the X direction, and the legs 4 can make that movement by means of the wire hinges 7, while the short wire piece 32 of the drive unit for the Y direction is not in the way of the hinge movement. The objective can also move in the Y direction. Compared with the hinge connection between the holder plate 2 and the strip 24 (X direction), the hinge connection between said plate 2 and the strip 33 differs by the addition of a bending plate 30 which permits hinge movement only in the Z direction and therefore eliminates any indeterminateness in the support of the plate 2.

The objective in the X direction is caused to vibrate with a higher frequency (typically 50 Hz) than in the Y and Z direction. An unpleasant vibration of the device caused by the 50 Hz displacement in the X direction can be eliminated by a counter-drive operating on a weight, the mass of the weight corresponding to that of the objective.

The bending plate 25, the corresponding bending plate in the Y drive and the bending plate 9 can be equipped with bending sensors, so that the X, Y and Z position of the focusing element can be deduced from the extent of the various bends.

The focusing element is set up on a plate 38 which has a mounting device on the bottom to permit mounting on a standard microscope objective holder.

The device according to FIGS. 7–10 differs from that according to FIGS. 1 to 6 only in that the structure 5 which is movable in the Z direction comprises two intermeshing parts 42, 43 which at 44, 45 are hingedly fitted relative to a fixed block 16, and a strip 46 which is fixed to part 43 and is connected to part 42 by means of two wires 47. Of course, the plate 43 and the strip 46 are provided with an opening 48 for the passage of a beam to be focused by the objective. When the drive element 6 causes the part 43 to hinge upwards about the hinges 45, the strip 46 will carry the hinge part 42 with it. The legs 4 are provided with short wire pieces 7 at their top and bottom ends. The places where the bottom wire pieces come into contact with the hinge parts 42, 43 are indicated by 7b in FIG. 10. It will be clear that the symmetrical hinge movement of the parts 42 and 43 leads to the same movement in the Z direction of the legs 4.

Figure 1A:
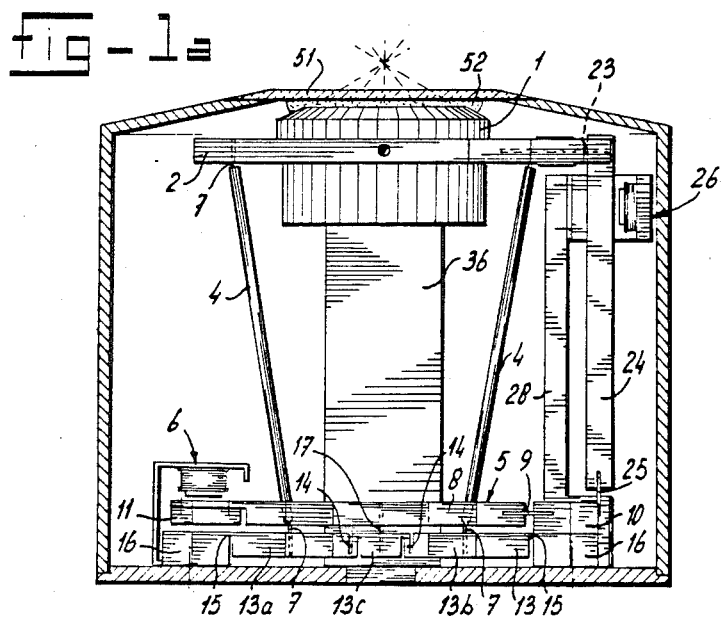
FIG. 1a shows a variant of FIG. 1.

If a so-called immersion objective is used as the focusing element, the housing of the scanning device can be designed as indicated in FIG. 1a. The top of the scanning device can then be closed with such thin glass plate 51 that the focusing point of the focusing element lies outside the scanning device, as indicated by the dotted lines in FIG. 1a. Immersion oil 52 is present between the focusing element 1 designed as an immersion objective and the glass plate 51, as required for the optical operation of said immersion objective, while said oil also permits the movements of the focusing element described above. The advantage of the housing shown in FIG. 1a is that the scanning device forms an enclosed unit, so that dust and other external influences on the scanning device are excluded.

It is essential for the invention that the objective 1 can be moved controllably and accurately in the X, Y and Z direction, so that during scanning of an object the object table can stay still. The support and the drive are separate.

Any focusing element for the focusing of electromagnetic waves or sound can be used, instead of the objective 1. Use with a scanning microscope, in particular a confocal microscope, gives major advantages: use with other equipment in an analogous form, such as catheters, is one possibility. It can also be used in flow cytometry, where the adjustment possibilities of the device described here are used to make the measuring range determined by the optics coincide with the liquid flow which is carrying the particles to be analysed. The movements in the X and Y direction lead to a movement of the objective along a slightly curved surface. It is possible to make the movement take place in a flat surface by a compensating movement in the Z direction. Various modifications of the structures described are possible within the scope of the claims.

I claim:

1. Device for focusing electromagnetic waves or sound, comprising a focusing element fitted in a holder having two edges which is supported in such a way that moving it in three directions perpendicular to each other (X, Y and Z directions) is possible, while drive units are present to move the holder independently in said three directions, characterized in that the holder rests by means of hinges on at least three legs each having top and bottom ends which at said bottom ends are connected by means of hinges to a structure which can be moved in the Z direction, and that the holder for movement in the X and Y directions is hingedly connected by said two edges which are perpendicular to each other and to a strip which can be moved to and fro by means of said drive units.

2. Device according to claim 1, characterized in that the hinges at the top and bottom end of the said legs are made of short wire pieces.

3. Device according to claim 1 or 2, characterized in that the legs are disposed at an angle in such a way that the optical axis of the focusing element remains directed virtually at a fixed focussing point during the X, Y movement.

4. Device according to claim 1 or 2, characterized in that the structure which is movable in the Z direction is made up of a bottom plate comprising three parts the central part of which is hingedly connected to the outermost parts and at one or more points lying centrally between the hinges is connected to a plate having two edges said plate at said one edge being movable up and down by a drive unit for the Z direction, and at said opposite edge is hingedly fastened.

5. Device according to claim 4, characterized in that the three parts form a single plate and each of the hinges between the central and the outermost parts consists of grooves which are provided at a short distance from each other and which are cut in starting from various surfaces of the plate.

6. Device according to one of claims 1 or 2, characterized in that the structure which can be moved in the Z direction is made up of two intermeshing hingeable parts whose hinges lie directly opposite each other and a strip which is connected to one of said parts and which is connected by means of wire hinges to the other part.

7. Device according to claim 6, characterized in that a bending plate in the X direction, a corresponding bending plate in the Y direction and bending strips for the Z direction are equipped with bending sensors to permit a determination of the X, Y and Z position of the focusing element.

8. Device according to claim 1 characterized in that a focusing system of the immersion objective type is used, and the device can be closed with a thin glass plate in such a way that the focusing point of the focusing system lies outside the scanning device.

9. Device according to claim 1, characterized in that the two hinges of the holder are made of a piece of wire and the hinge movement of one of said pieces of wire is limited by a bending plate which does permit hinge movement in the Z direction.

10. Device according to claim 1 characterized in that the drive units comprise a fixed electromagnet and a movable piece of magnetic or magnetizable material.

11. Device according to claim 1 provided with an object holder and an objective, characterized in that the object holder assumes a fixed position and the objective is designed as a focusing element.

* * * * *